(12) United States Patent
Lee (10) Patent No.: US 10,955,639 B2
(45) Date of Patent: Mar. 23, 2021

(54) FILTER DRIVING DEVICE AND CAMERA MODULE INCLUDING SAME

(71) Applicant: LG INNOTEK CO., LTD., Seoul (KR)

(72) Inventor: Hee Se Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 534 days.

(21) Appl. No.: 15/577,132

(22) PCT Filed: May 26, 2016

(86) PCT No.: PCT/KR2016/005554
§ 371 (c)(1),
(2) Date: Nov. 27, 2017

(87) PCT Pub. No.: WO2016/190668
PCT Pub. Date: Dec. 1, 2016

(65) Prior Publication Data
US 2018/0172943 A1    Jun. 21, 2018

(30) Foreign Application Priority Data

May 27, 2015 (KR) .......................... 10-2015-0073549

(51) Int. Cl.
| | | |
|---|---|---|
| *G06K 7/10* | (2006.01) | |
| *G02B 7/00* | (2021.01) | |
| *G03B 17/12* | (2021.01) | |
| *G02B 5/20* | (2006.01) | |
| *H04N 5/225* | (2006.01) | |

(Continued)

(52) U.S. Cl.
CPC .............. *G02B 7/006* (2013.01); *G02B 5/208* (2013.01); *G03B 11/00* (2013.01); *G03B 17/12* (2013.01); *H04N 5/2257* (2013.01); *F16H 19/02* (2013.01); *G03B 2205/0053* (2013.01)

(58) Field of Classification Search
CPC ....... G02B 7/006; G02B 5/02–8; G03B 11/00; G03B 17/12; G03B 2205/0053; H04N 5/2257; F16H 19/02
USPC ........................................................ 359/350
See application file for complete search history.

(56) References Cited

U.S. PATENT DOCUMENTS

| | | | | |
|---|---|---|---|---|
| 5,752,120 A | * | 5/1998 | Tanaka ................... | G03B 17/02 396/536 |
| 2005/0141117 A1 | * | 6/2005 | Kim ...................... | G02B 26/007 359/892 |
| 2005/0219399 A1 | * | 10/2005 | Sato ...................... | H04N 5/2253 348/340 |

FOREIGN PATENT DOCUMENTS

| | | | |
|---|---|---|---|
| JP | 8-248472 A | 9/1996 | |
| JP | 2002-174839 A | 6/2002 | |
| JP | 2002174839 A * | 6/2002 | ............. G03B 11/00 |

(Continued)

*Primary Examiner* — Stephone B Allen
*Assistant Examiner* — Jyotsna V Dabbi
(74) *Attorney, Agent, or Firm* — Birch, Stewart, Kolasch & Birch, LLP (57) ABSTRACT

A filter driving device including a filter; a coupling part to which the filter is coupled; a crank arm of which one side is connected to the coupling part and of which the other side is connected to a driving shaft, and which reciprocatingly rotates around the driving shaft; a first stopper provided at a part close to the driving shaft from the center portion of the crank arm, and restricting the rotational angle of the crank arm; and an accommodation part for accommodating the filter, the coupling part and the crank arm is provided.

17 Claims, 6 Drawing Sheets

(51) Int. Cl.
*G03B 11/00* (2021.01)
*F16H 19/02* (2006.01)

(56) References Cited

FOREIGN PATENT DOCUMENTS

| KR | 20-0356741 Y1 | 7/2004 | |
|---|---|---|---|
| KR | 20-0432646 | * 12/2006 | ............... G03B 9/02 |
| KR | 20-0432646 Y1 | 12/2006 | |
| KR | 10-2010-0104556 A | 9/2010 | |

* cited by examiner

FILTER DRIVING DEVICE AND CAMERA MODULE INCLUDING SAME

CROSS REFERENCE TO RELATED APPLICATIONS

This application is the National Phase of PCT International Application No. PCT/KR2016/005554, filed on May 26, 2016, which claims priority under 35 U.S.C. 119(a) to Patent Application No. 10-2015-0073549, filed in the Republic of Korea on May 27, 2015, all of which are hereby expressly incorporated by reference into the present application.

TECHNICAL FIELD

Embodiments relate to a filter driving device and a camera module including the same.

BACKGROUND ART

The contents described in this section merely provide background information on the embodiments and do not constitute the prior art.

The camera module included in a photographing apparatus may be provided with a filter. Such a filter is used for the purpose of enhancing sharpness of the captured image, implementing necessary effects in the image, and the like.

Desired images may be obtained using various kinds of filters rather than using one filter. Therefore, the camera module is equipped with several filters or several types of filters, and it is necessary to attach different filters according to a subject to be photographed.

Accordingly, the camera module may be provided with a filter driving device capable of applying various kinds of filters. Such a filter driving device may be driven manually or automatically.

An automatically driven filter driving device may be automatically be driven by, for example, ambient luminance to replace a filter with another one.

However, since such a filter driving device requires mechanical driving, it may make a collision sound by contact or collision with other structures, mechanisms, devices, and the like provided in the camera module during operation.

Such a collision sound may make a user of the photographing apparatus or a person around the photographing apparatus feel uncomfortable. Therefore, it is necessary to improve the filter driving device to significantly attenuate this collision sound.

DISCLOSURE

Technical Problem

Embodiments provide a filter driving device capable of remarkably attenuating occurrence of a collision sound during operation.

The technical objects that can be achieved through the embodiments are not limited to what has been particularly described hereinabove and other technical objects not described herein will be more clearly understood by those skilled in the art from the following detailed description.

Technical Solution

In one embodiment, a filter driving device may include a filter, a coupling part coupled with the filter, a crank arm having one side connected to the coupling part and an opposite side connected to a drive shaft, the crank arm reciprocatingly rotating about the drive shaft, a first stopper provided at a position near the drive shaft when viewed from a center of the crank arm and configured to restrict a rotation angle of the crank arm, and an accommodation portion configured to accommodate the filter, the coupling part, and the crank arm.

In anther embodiment, a filter driving device may include a filter, a coupling part coupled with the filter, a crank arm having one side connected to the coupling part and an opposite side connected to a drive shaft, the crank arm reciprocatively rotating about the drive shaft, a blade protruding from a portion of the coupling part connected to the crank arm, a first stopper provided at a position near the drive shaft when viewed from a center of the crank arm and configured to restrict a rotation angle of the crank arm, an accommodation portion configured to accommodate the filter, the coupling part, and the crank arm, and a second stopper protruding from a wall surface of the accommodation portion and provided between the filter and the crank arm.

In one embodiment, a camera module may include the filter driving device.

Advantageous Effects

Embodiments provide a filter driving device capable of significantly attenuating a collision sound generated when a rotating crank arm comes into contact with or collides with an accommodation portion, or a structure, side wall, or the like formed in the accommodation portion.

Embodiments also provide a camera module including a filter driving device capable of significantly attenuating the collision sound. Thereby, when the camera module or photographing apparatus is installed in an indoor space or the cabin of a vehicle, discomfort caused to a person by the collision sound may be lessened.

BEST MODE

Hereinafter, embodiments will be described in detail with reference to the accompanying drawings. While the disclosure is susceptible to various modifications and alternative forms, specific embodiments thereof are shown by way of example in the drawings. However, the disclosure should not be construed as limited to the embodiments set forth herein, but on the contrary, the disclosure is to cover all modifications, equivalents, and alternatives falling within the spirit and scope of the embodiments. The sizes and shapes of the components shown in the drawings may be exaggerated for clarity and convenience.

It may be understood that, although the terms "first," "second," etc. may be used herein to describe various elements, these elements are not to be limited by these terms. These terms are only used to distinguish one element from another. In addition, terms particularly defined in consideration of the construction and operation of the embodiments are used only to describe the embodiments, but do not limit the scope of the embodiments.

In the description of the embodiments, it is to be understood that when an element is described as being "on" or "under" another element, it can be "directly" on or under another element or can be "indirectly" formed such that one or more other intervening elements are also present between the two elements. In addition, when an element is described as being "on" or "under," the term "on" or "under" may refer to not only the upper side but also the lower side with respect to the element.

It is also to be understood that relational terms, such as on/upper portion/above and under/lower portion/below, are used only to distinguish between one subject or element and another subject or element without necessarily requiring or involving any physical or logical relationship or sequence between such subjects or elements.

Further, in the drawings, a Cartesian coordinate system (x, y, z) may be used. In the drawings, the x-axis and y-axis represent planes perpendicular to the optical axis. For simplicity, the optical axis direction (z-axis direction) may be referred to as a first direction, the x-axis direction as a second direction, and the y-axis direction as a third direction.

Figure 1:
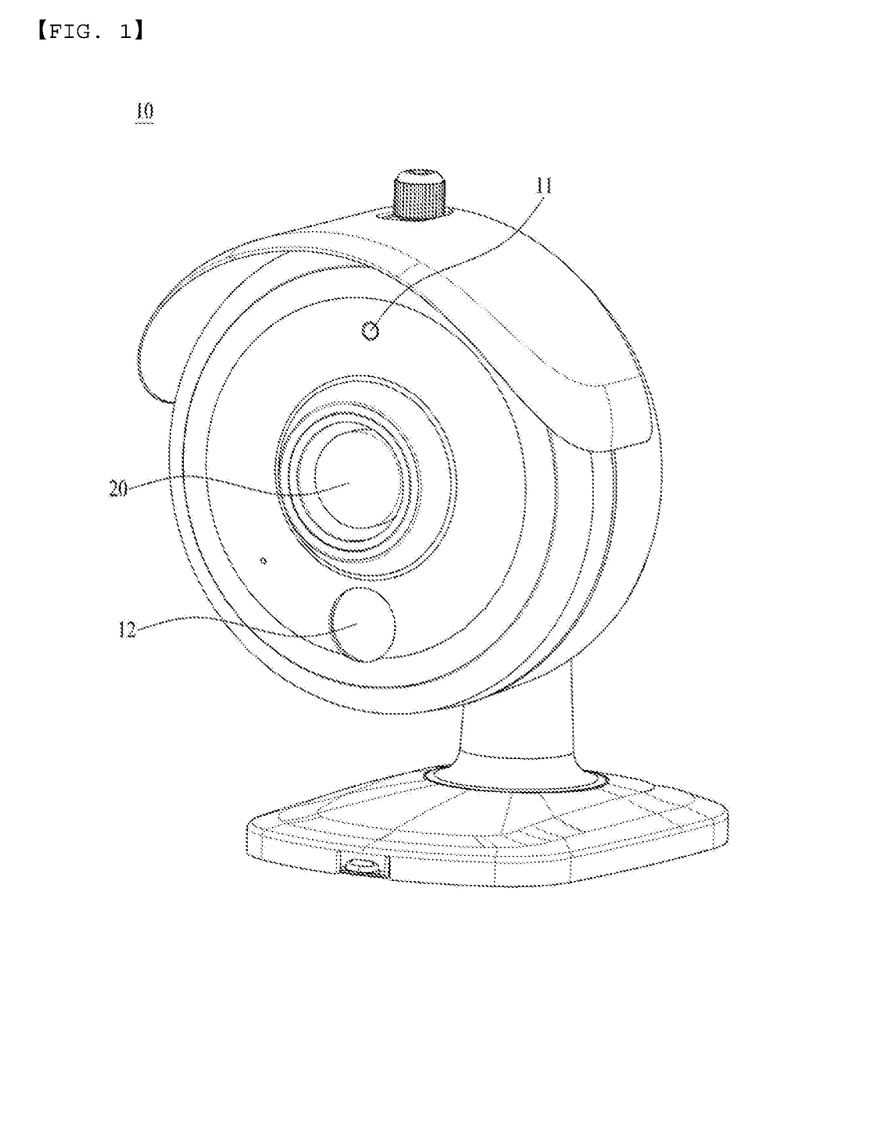
FIG. 1 is a perspective view illustrating a photographing apparatus in which a camera module according to an embodiment is mounted.

FIG. 1 is a perspective view illustrating a photographing apparatus 10 in which a camera module 20 according to an embodiment is mounted. The photographing apparatus 10 of the embodiment may be for outdoor use. For example, it may be used for crime prevention, traffic control and monitoring.

The photographing apparatus 10 of the embodiment may be used, for example, for monitoring, video call, and the like in an indoor space of, for example, a house, an office or a shop. In addition, it may be installed in a cabin or the like of a vehicle in order to be used for a black box mounted on a vehicle or the like.

The photographing apparatus 10 may include an illuminance sensor 11, a speaker 12, and a camera module 20. The illuminance sensor 11 may measure the illuminance of surroundings of the photographing apparatus 10. The photographing apparatus 10 may measure the illuminance of the surroundings through the illuminance sensor 11, and the type or characteristics of the filter 100, which is used for light incident on the image sensor inside the camera module 20 through a lens barrel 21, which will be described later, may vary on the basis of a certain illuminance level.

For example, in the daytime when the illuminance is high, it may be appropriate to use an infrared cut filter 110 for the light incident on the image sensor since the sharpness of an image captured by the camera module 20 may be enhanced when the infrared rays included in the incident light are filtered out.

On the other hand, in the night time when the illuminance is low, it may be appropriate not to use the infrared cut filter 110 for the light incident on the image sensor since the infrared rays included in the incident light may enhance identification of the subject.

Therefore, the filter driving device of the embodiment may function to arrange or remove the infrared cut filter 110 at or from a place between the lens barrel 21 and the image sensor according to the illuminance measured from the illuminance sensor 11. The structure of the filter driving device will be described in detail later.

The speaker 12 may be used when it is necessary to transmit a voice signal for a broadcast or an alarm to a place where the photographing apparatus 10 is disposed. In another embodiment, a microphone may be provided instead of the speaker 12 to collect sound of a voice or the like generated in a place where the photographing apparatus 10 is disposed through the microphone in the event of emergency. In another embodiment, the photographing apparatus 10 may include both the speaker 12 and the microphone.

Figure 2:
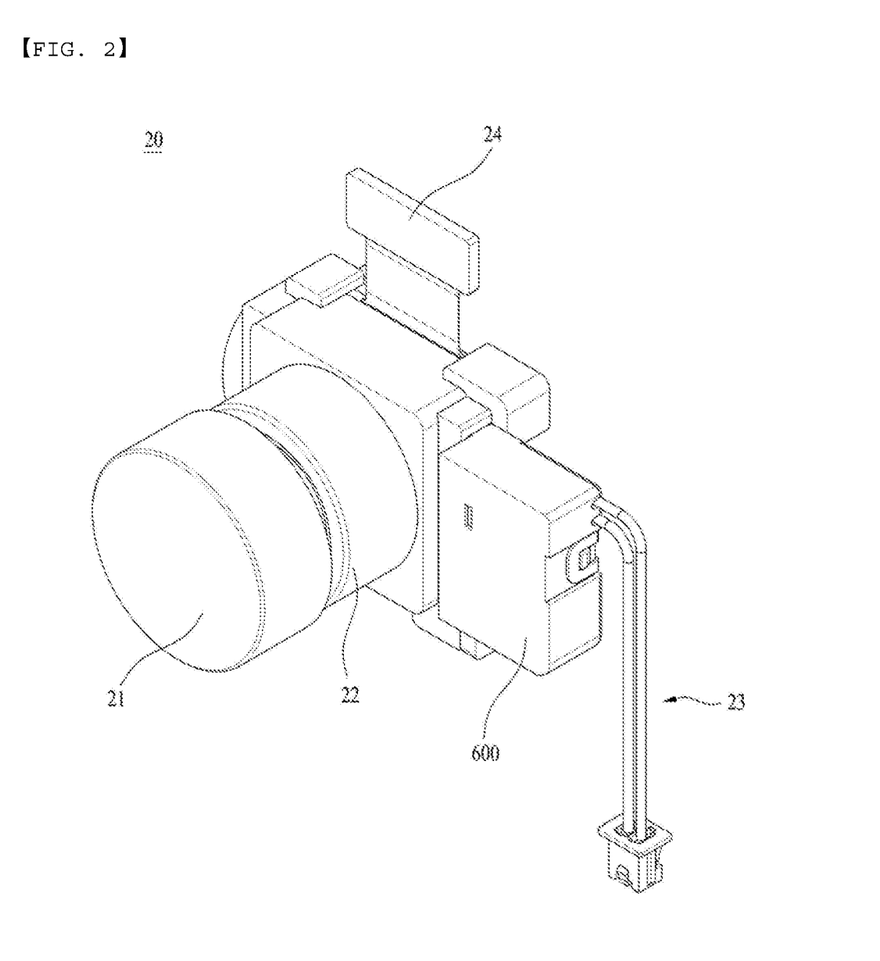
FIG. 2 is a perspective view illustrating a camera module according to an embodiment.

The camera module 20 is mounted on the photographing apparatus 10 and may photograph a nearby subject. FIG. 2 is a perspective view illustrating a camera module 20 according to an embodiment. The camera module 20 may include a lens barrel 21, a holder 22, a cable connector 23, a printed circuit board 24, and an accommodation portion 600.

The lens barrel 21 is a portion through which incident light is transmitted. The lens barrel 21 may be coupled to the holder 22 in various manners. For example, female threads may be formed on the holder 22, and male threads corresponding to the female threads may be formed on the outer circumferential surface of the lens barrel 21. Thereby, the lens barrel 21 is coupled to the holder are 22 through screw-coupling between the female and male threads.

However, embodiments are limited thereto. In a method other than screwing coupling the lens barrel 21 into the holder 22, the lens barrel 21 may be directly fixed to the inside of the holder 22 without forming threads on the holder 22. Alternatively, one or more lenses may be integrated with the holder 22 without the lens barrel 21.

One lens may be coupled to the lens barrel 21 or two or more lenses may constitute an optical system.

The lens barrel 21 may be coupled to the front portion of the holder 22, and the printed circuit board on 24 may be coupled to the rear portion of the holder, namely the opposite side of the lens barrel 21. The holder 22 may be coupled to an accommodation portion 600, in which the filter 100 disposed in a direction perpendicular to the optical axis of the incident light incident on the lens barrel 21 is accommodated.

The cable connector 23 may be connected to an external power source for supplying power to rotate the crank arm 400 accommodated in the accommodation portion 600. The cable connector 23 may be electrically connected to a driving device (not shown) configured to drive a drive shaft 300 for rotating the crank arm 400 such that the external power source supplies electric power to the driving device. Here, the driving device may be mounted in the accommodation portion 600.

The printed circuit board 24 may be coupled to the back of the holder 22 and an image sensor (not shown) may be mounted on a portion of the printed circuit board 24 that faces the lens barrel 21. That is, the incident light incident on the lens barrel 21 may pass through the filter 100 and form an image on the image sensor.

In addition, the printed circuit board 24 may be provided with various printed circuits, devices, etc. in order to convert the image formed on the image sensor into an electrical signal and transmit the electrical signal to an external device. The printed circuit board 24 may be provided with a connector for electrical connection with external devices.

The accommodation portion 600 may be coupled to the holder 22, and a filter 100, a coupling part 200, and a crank arm 400, which will be described later, may be arranged in the accommodation portion 600. The specific internal structure of the accommodation portion 600 will be described later.

Figure 3:
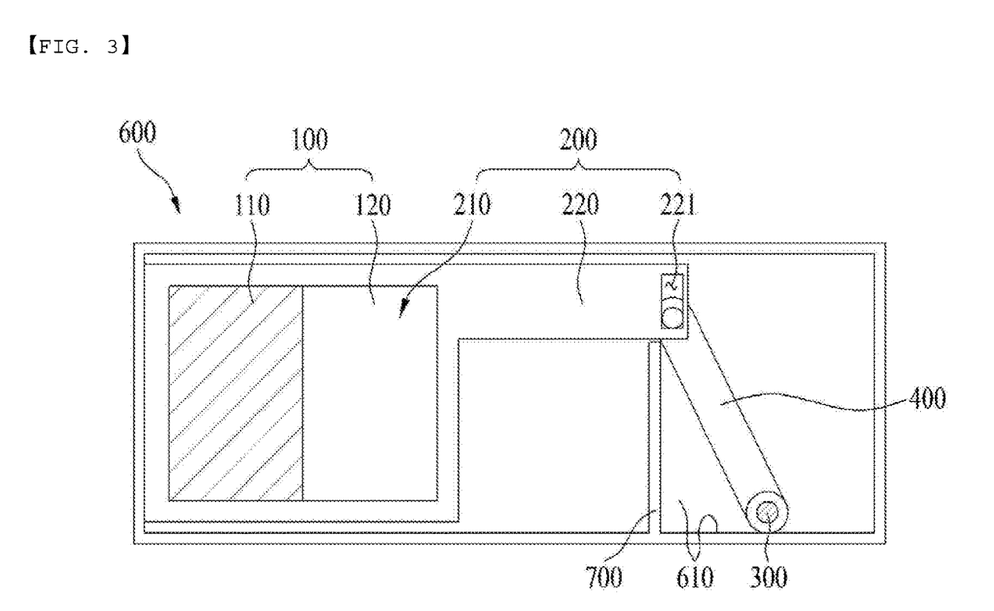
FIG. 3 is a view illustrating a filter driving device according to an embodiment.

FIG. 3 is a view illustrating a filter driving device according to an embodiment. FIG. 3 is a partial cross-sectional view of the accommodation portion 600 to clarify the structure of the filter driving device of the embodiment. This illustration is also applied to FIGS. 4 to 8.

The filter driving device of the embodiment may include an accommodation portion 600, a filter 100, a coupling part 200, a crank arm 400, a first stopper 500, and a second stopper 700. Each embodiment of the first stopper 500 will be described later.

As shown in FIG. 3, a space may be defined in the accommodation portion 600, and the filter 100, the coupling part 200, and the crank arm 400 may be accommodated in the space. The crank arm 400 may be connected to the drive shaft 300 and reciprocatingly rotate as the drive shaft 300 rotates. The filter 100 connected to the crank arm 400 may linearly reciprocate as the crank arm 400 rotates.

The filter 100 may be provided between the lens barrel 21 and the image sensor when viewed along the optical axis of the incident light, and may linearly reciprocate in a direction perpendicular to the optical axis. A part of the filter 100 may be configured with an infrared cut filter 110 and the other part thereof may be configured with a dummy filter.

As shown in FIG. 3, the filter 100 may be formed in a rectangular plate shape, for example. Half of the filter 100 may include the infrared cut filter 110 and the other half may include the dummy filter 120. Here, the dummy filter 120 may pass light of all wavelengths without blocking the infrared rays.

Since the filter 100 linearly reciprocates along a plane perpendicular to the optical axis of the incident light, the incident light may face the infrared cut filter 110 along the optical axis, or may face the dummy filter 120 along the optical axis.

Therefore, as described above, when the illuminance of the surroundings is high, incident light may be aligned with the infrared cut filter 110, and be transmitted through the infrared cut filter 110 to form an image on the image sensor. Thereby, a high-definition image may be captured.

When the illuminance of the surroundings is low, incident light may be aligned with the dummy filter 120, and be transmitted through the dummy filter 120 to form an image on the image sensor. Thereby, identification of a subject in the captured image may be enhanced by the infrared rays.

The coupling part 200, which is a portion to which the filter 100 is coupled, may reciprocate linearly as the crank arm 400 reciprocatingly rotates. Thus, the filter 100 may also reciprocate linearly in a direction perpendicular to the optical axis. The coupling part 200 may include a penetration portion 210 and a blade 220.

The penetration portion 210 may be formed at the portion to which the filter 100 is coupled. That is, when the filter 100 is coupled to the coupling part 200, the filter 100 may cover the penetration portion 210. Accordingly, the incident light form an image on the image sensor by passing through the filter 100 and the penetration portion 210.

The blade 220 may protrude from a portion of the coupling part 200 which is connected to the crank arm 400 and may have a slit 221 formed therein.

The slit 221 may be formed at one end of the blade 220 to which the crank arm 400 is connected. As shown in FIG. 3, a side of the crank arm 400 which is connected to the blade 220 may reciprocate along the slit 221.

The structure of the blade 220 described above may convert rotation of the crank arm 400 into linear reciprocating motion of the blade 220. Thereby, the coupling part 200 and the filter 100 coupled thereto may reciprocate linearly in a direction perpendicular to the optical axis.

The drive shaft 300 may be connected to one side of the crank arm 400 and may be connected to the driving device to rotate as described above. When the drive shaft 300 rotates, the crank arm 400 may rotate.

One side of the crank arm 400 may be connected to the coupling part 200 and the opposite side of the crank arm may be connected to the drive shaft 300. Thus, the crank arm may reciprocatingly rotate about the drive shaft 300. As the crank arm 400 reciprocatingly rotates, the filter 100 may reciprocate linearly.

The rotation angle of the crank arm 400 may be limited by a first stopper 500, a second stopper 700 and a third stopper 800. The second stopper 700 will be described first with reference to FIG. 3.

As shown in FIG. 3, the second stopper 700 may protrude from a wall surface 610 of the accommodation portion 600 and may be provided between the filter 100 and the crank arm 400. The second stopper 700 may protrude from the wall surface 610 of the accommodation portion 600 at the lower side and the wall surface 610 of the accommodation portion 600 on the face of the sheet of the figure as viewed in the direction pointing into FIG. 3. In addition, the second stopper 700 may be integrated with the accommodation portion 600.

In FIG. 3, when the crank arm 400 rotates counterclockwise, it may come into contact with the second stopper 700 and thus rotation of the crank arm 400 may be limited. When the crank arm 400 comes into contact with the second stopper 700, the operation of the driving device connected to the rotating shaft is stopped, and the crank arm 400 does not rotate any longer.

When the first stopper 500, which will be described later, or the second stopper 700 is worn or damaged and is thus unable to appropriately limit the rotation angle of the crank arm 400, the second stopper 700 may serve to adjunctively limit the rotation angle of the crank arm 400.

Figure 4:
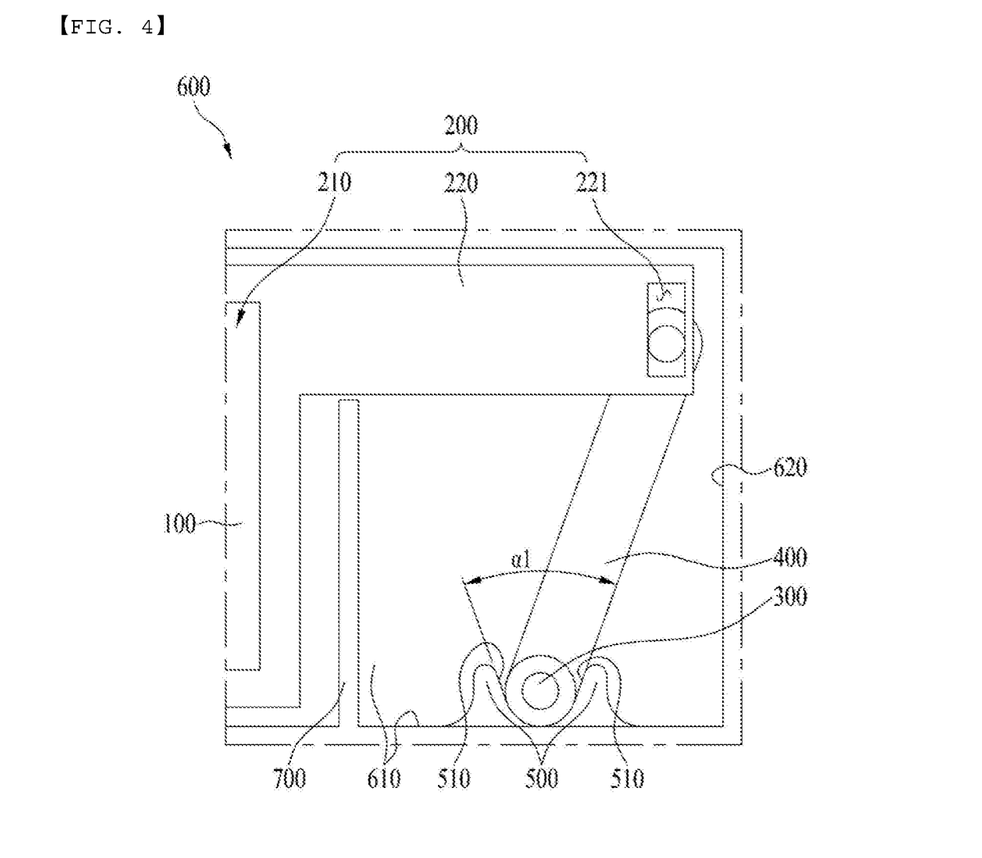
FIG. 4 is a view illustrating a filter driving device according to another embodiment.

FIG. 4 is a view illustrating a filter driving device according to another embodiment. As shown in FIG. 4, the filter driving device of the embodiment may include a first stopper 500. The first stopper 500 is provided at a position near the drive shaft 300 as viewed from the center of the crank arm 400 and may serve to restrict the rotation angle of the crank arm 400.

When the filter 100 is switched from the infrared cut filter 110 to the dummy filter 120 or vice versa, the crank arm 400 may be rotated clockwise or counterclockwise in FIG. 4.

Referring to FIG. 4, in the case where the first stopper 500 is not provided, when the crank arm 400 rotates, it may come into contact with the second stopper 700 or the side wall 620 of the accommodation portion 600 to stop rotating. When the crank arm 400 contacts the second stopper 700 or the side wall 620 of the accommodation portion 600, a collision sound is generated.

The collision sound may become serious noise, particularly, when the photographing apparatus 10 is installed in an indoor space, a cabin of a vehicle or the like. Therefore, an apparatus or structure capable of reducing the magnitude of such a collision sound is required. The first stopper 500 may perform this function.

Since the crank arm 400 rotates about the drive shaft 300, even if points on the crank arm 400 rotate at the same angular speed, the linear speed increases as the distance from the drive shaft 300 increases. Therefore, referring to FIG. 4, when the crank arm 400 hits any of the second stopper 700 and the side wall 620 of the accommodation portion 600, which are located far from the drive shaft 300, a large collision sound may be generated due to the high linear speed of the colliding point of the crank arm 400.

On the other hand, when the crank arm 400 collides with the first stopper 500, which is located near the drive shaft 300, the impact force and the impact energy are remarkably reduced due to the low linear speed of the colliding point of the crank arm 400. Therefore, it may be appropriate that the first stopper 500 is provided at a position near the drive shaft 300 when viewed from the center of the crank arm 400, as shown in FIG. 4.

The first stopper 500 of the embodiment shown in FIG. 4 may protrude from the wall surface 610 of the accommodation portion 600 and be arranged to at least partially surround the drive shaft 300 and one end of the crank arm 400, and may include a first rotation restricting surface 510.

Here, the first stopper 500 may protrude from the wall surface 610 of the accommodation portion 600 at the lower side and the wall surface 610 of the accommodation portion 600 on the face of the sheet of the figure, when viewed in the direction pointing into FIG. 4. In addition, the second stopper 700 may be integrated with the accommodation portion 600.

As shown in FIG. 4, the first rotation restricting surface 510 may be formed as a pair of surfaces facing the first stopper 500, and at least a part of the first rotation restricting surface 510 may be formed in the shape of a straight line. When the straight portion of the crank arm 400 contacts the first rotation restricting surface 510, rotation thereof may be restricted.

The pair of first rotation restricting surfaces 510 may form an angle α1 equal to the rotation angle of the crank arm 400. Accordingly, the crank arm 400 may rotate by the angle α1 formed by the pair of first rotation restricting surfaces 510.

Therefore, the angle α1 may be appropriately set to prevent the crank arm 400 from colliding with the second stopper 700 and the side wall 620 of the accommodation portion 600 during rotation of the crank arm 400, thereby significantly reducing the magnitude of the collision sound.

Figure 5:
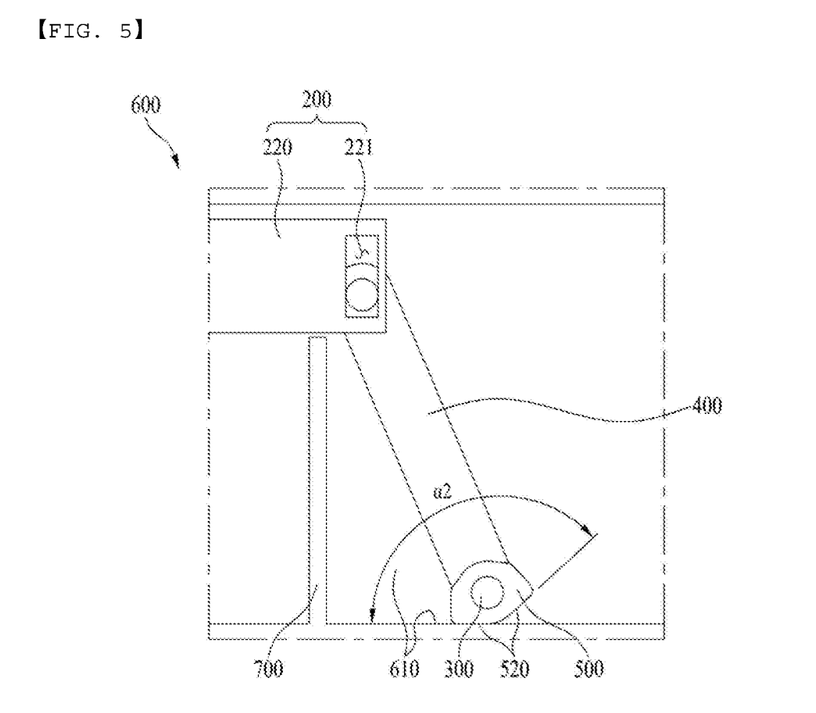
FIG. 5 is a view illustrating a filter driving device according to another embodiment.

FIG. 5 is a view illustrating a filter driving device according to another embodiment. The first stopper 500 of the embodiment shown in FIG. 5 may be fitted onto the drive shaft 300 and fixed to the crank arm 400, and may include a second rotation restricting surface 520 configured to contact the wall surface 610 of the accommodation portion 600 and having at least one portion formed in the shape of a straight line.

The first stopper 500 is fixed to the crank arm 400. Accordingly, when the crank arm 400 rotates, the first stopper 500 may also rotate, and the second rotation restricting surface 520 may come into contact with the wall surface 610 of the accommodation portion 600 at the lower side of FIG. 5 to restrict rotation of the crank arm 400. Here, the first stopper 500 may be integrated with the crank arm 400.

In this case, the second rotation restricting surface 520 may be configured by a pair of surfaces symmetrical to each other, and the pair of the second rotation restricting surfaces 520 may form an angle α2 equal to the rotation angle of the crank arm 400 therebetween. Accordingly, the crank arm 400 may rotate by the angle α2 formed by the pair of second rotation restricting surfaces 520.

Therefore, the angle α2 may be appropriately set to prevent the crank arm 400 from colliding with the second stopper 700 and the side wall 620 of the accommodation portion 600 during rotation of the crank arm 400, thereby significantly reducing the magnitude of the collision sound.

Figure 6:
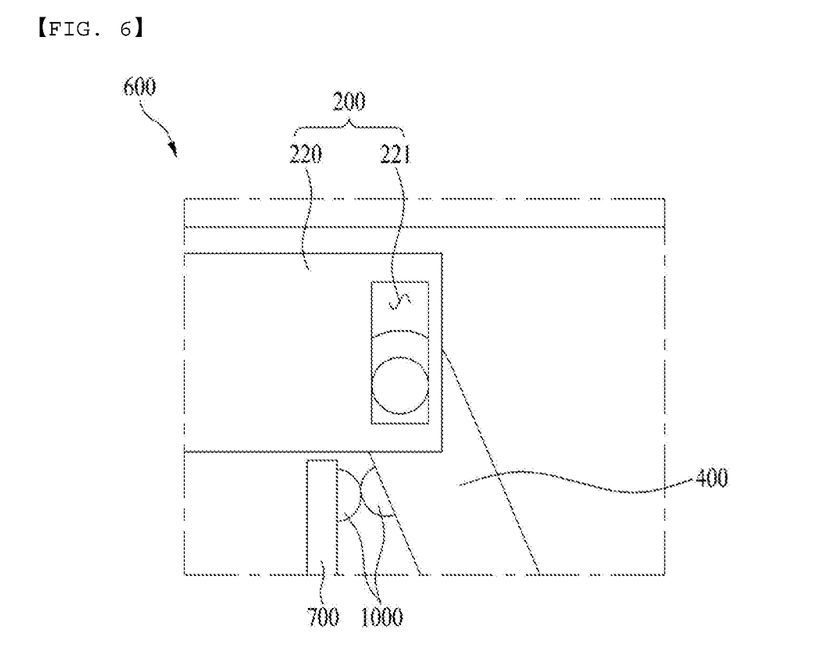
FIG. 6 is a view illustrating a filter driving device according to another embodiment.

FIG. 6 is a view illustrating a filter driving device according to another embodiment. In the embodiment shown in FIG. 6, the filter driving device may include a shock absorber 1000. That is, the second stopper 700 and the crank arm 400 may be provided with a shock absorber 1000 protruding such that the shock absorbers 1000 face each other.

The pair of shock absorbers 1000 may prevent direct contact between the crank arm 400 and the second stopper 700 to prevent a collision sound from being generated between the crank arm 400 and the second stopper.

In order to reduce the magnitude of the collision sound generated when the shock absorbers 1000 collide with each other, the shock absorbers 1000 are made of a material capable of absorbing noise, for example, a flexible polymer or the like.

The shock absorbers 1000 may prevent the crank arm 400 and the second stopper 700 from coming into direct contact with each other when the first stopper 500 and a third stopper 800, which will be described below, are worn. Therefore, the pair of shock absorbers 1000 may be applied to the filter driving devices having the second stopper 700 and the third stopper 800.

Figure 7:
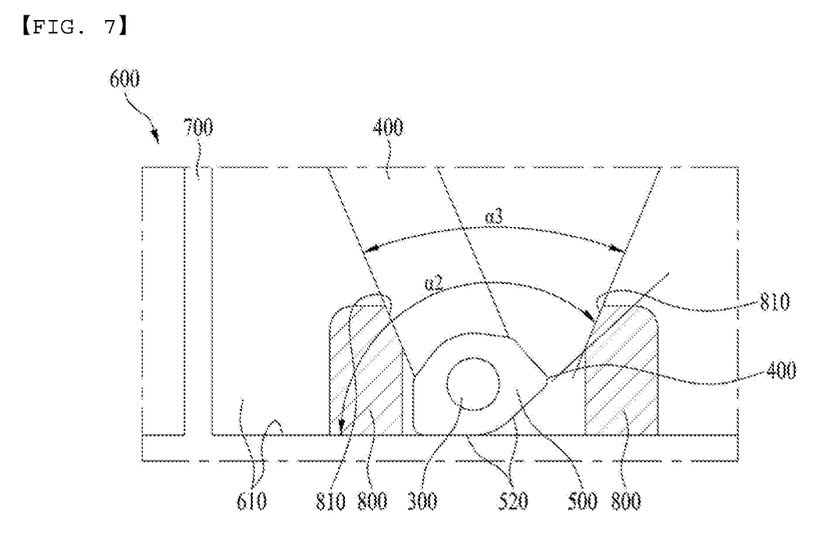
FIG. 7 is a view illustrating a filter driving device according to another embodiment.

FIG. 7 is a view illustrating a filter driving device according to another embodiment. In the embodiment shown in FIG. 7, the filter driving device may include a third stopper 800. The third stopper 800 may protrude from the wall surface 610 of the accommodation portion 600 and be arranged to at least partially surround the drive shaft 300, one end of the crank arm 400 and the first stopper 500.

Here, the third stopper 800 may protrude from the wall surface 610 of the accommodation portion 600 at the lower side and the wall surface 610 of the accommodation portion 600 on the face of the sheet of the figure, when viewed in the direction pointing into FIG. 7. In another embodiment, the third stopper 800 may protrude only from the wall surface 610 of the accommodation portion 600 on the face of the sheet of the figure, when viewed in the direction pointing into FIG. 7. In addition, the second stopper 700 may be integrated with the accommodation portion 600.

FIG. 7 illustrates that the third stopper 800 and the first stopper 500 are provided together. However, in another embodiment, only the third stopper 800 may be provided without the first stopper 500.

The third stopper 800 of the embodiment illustrated in FIG. 7 may include a pair of fourth rotation restricting surfaces 810, which contact the straight portion of the crank arm 400 and have at least a part formed in a straight line. Accordingly, the straight portion of the crank arm 400 may contact the fourth rotation restricting surfaces 810 to restrict rotation of the crank arm.

Here, the pair of fourth rotation restricting surfaces 810 may form an angle α3 equal to the rotation angle of the crank arm 400 therebetween. Therefore, the crank arm 400 may rotate by the angle α3 formed by the pair of fourth rotation restricting surfaces 810.

Therefore, the angle α3 may be appropriately set to prevent the crank arm 400 from colliding with the second stopper 700 and the side wall 620 of the accommodation portion 600 during rotation of the crank arm 400, thereby significantly reducing the magnitude of the collision sound.

When the first stopper 500 and the third stopper 800 are provided together as shown in FIG. 7, the angle α2 formed by the pair of second rotation restricting surfaces 520 is not necessarily equal to the angle α3 formed by the pair of fourth rotation restricting surfaces 810.

Therefore, the crank arm 400 may rotate by the smaller one of the angle α2 and the angle α3. When the stopper having the rotation restricting surfaces forming the smaller one of the angle α2 and the angle α3 between the first stopper 500 and the third stopper 800 is worn by repetitive rotation of the crank arm 400, the other stopper having the larger one of the angle α2 and the angle α3 may restrict the rotation angle of the crank arm 400.

Figure 8:
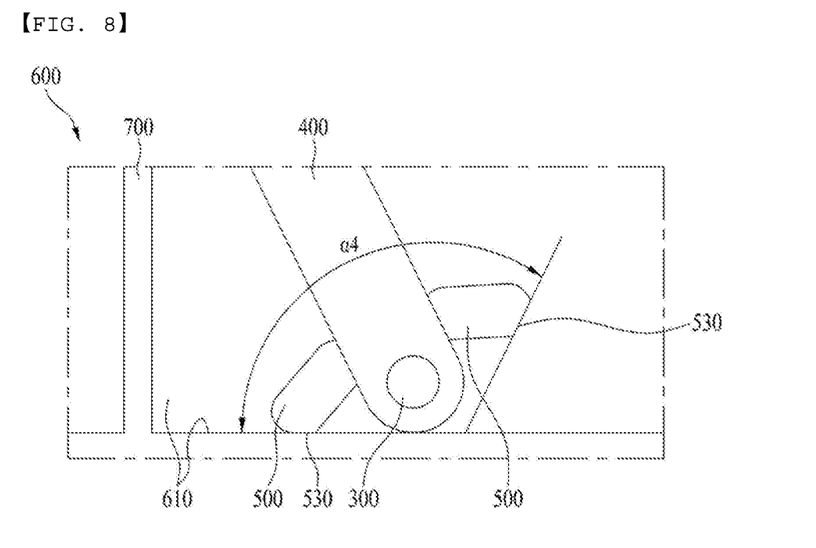
FIG. 8 is a view illustrating a filter driving device according to another embodiment.

FIG. 8 is a view illustrating a filter driving device according to another embodiment. The first stopper 500 of the embodiment shown in FIG. 8 is formed by a pair of stoppers protruding from both sides of the crank arm 400, and include a pair of third rotation restricting surfaces 530 making contact with the wall surface 610 of the accommodation portion 600 having at least one part formed in the shape of a straight line.

The first stopper 500 protrudes from the crank arm 400. Accordingly, when the crank arm 400 rotates, the first stopper 500 may also rotate, and the third rotation restricting surfaces 530 may come into contact with the wall surface 610 of the accommodation portion 600 at the lower side of FIG. 8 to restrict rotation of the crank arm 400. Here, the first stopper 500 may be integrated with the crank arm 400.

In this case, the third rotation restricting surfaces 530 may be provided in a pair so as to be symmetrical to each other, and the third rotation restricting surfaces 530 may form an angle α4 equal to the rotation angle of the crank arm 400 therebetween. Therefore, the crank arm 400 may rotate by the angle α2 formed by the pair of third rotation restricting surfaces 530.

Therefore, the angle α4 may be appropriately set to prevent the crank arm 400 from colliding with the second stopper 700 and the side wall 620 of the accommodation portion 600 during rotation of the crank arm 400, thereby significantly reducing the magnitude of the collision sound.

The filter driving device of the embodiment may significantly attenuate the collision sound generated when the rotating crank arm 400 contacts or collides with the accommodation portion 600 or a structure, a side wall, or the like formed inside the accommodation portion 600.

In addition, as the collision sound is significantly attenuated, when the camera module 20 or the photographing apparatus 10 that include the filter driving device of the embodiment is installed in an indoor space or the cabin of a vehicle, discomfort caused to a person by the collision sound may be lessened.

While only a few details have been described above in connection with the embodiments, various other forms of implementation are possible. The technical contents of the embodiments described above may be combined in various forms other than mutually incompatible technologies, thereby implementing a new embodiment.

INDUSTRIAL APPLICABILITY

The filter driving device of an embodiment may significantly attenuate the collision sound generated when a rotating crank arm contacts or collides with the accommodation portion or a structure, a side wall, or the like formed inside the accommodation portion. Therefore, the filter driving device is industrially applicable.

The invention claimed is:

1. A filter driving device, comprising:
    a filter;
    a coupling part coupled with the filter;
    a crank arm having a first side directly connected to the coupling part and a second side opposite to the first side connected to a drive shaft, the crank arm reciprocatively rotating about the drive shaft in a single plane;
    a first stopper directly attached to the drive shaft and configured to restrict a rotation angle of the crank arm; and
    an accommodation portion configured to accommodate the filter, the coupling part, and the crank arm,
    wherein the first stopper comprises a second rotation restricting surface attached to the drive shaft and fixed to the crank arm, to restrict rotation of the crank arm within the rotation angle by directly contacting a first wall surface of the accommodation portion,
    wherein the first wall surface of the accommodation portion is substantially planar, and
    wherein the second rotation restricting surface of the first stopper rotates together with the crank arm according to the rotation of the crank arm.

2. The filter driving device according to claim 1, wherein the coupling part comprises:
    a penetration portion at a portion of the coupling part coupled with the filter; and
    a blade protruding in a first direction from the penetration portion.

3. The filter driving device according to claim 2, wherein one end of the blade is provided with a slit extending in a second direction perpendicular to the first direction, the crank arm being connected to the slit, and
    wherein the first side of the crank arm is connected to the blade and reciprocates along the slit.

4. The filter driving device according to claim 2, further comprising:
    a second stopper protruding from the first wall surface of the accommodation portion towards the blade portion of the coupling part and protruding in a second direction perpendicular to the first direction, the second stopper being provided between the filter and the crank arm.

5. The filter driving device according to claim 4, wherein the second stopper and the crank arm are provided with a shock absorber, and
    wherein the shock absorbers protrude from the second stopper and the crank arm to face each other.

6. The filter driving device according to claim 1, wherein the filter includes an infrared cut filter and a dummy filter.

7. The filter driving device according to claim 1, wherein the coupling part linearly reciprocates when the crank arm reciprocatingly rotates.

8. The filter driving device according to claim 1, wherein the first stopper completely surrounds the drive shaft and one end of the crank arm at the second side of the crank arm.

9. The filter driving device according to claim 1, wherein the second rotation restricting surface comprises a pair of surfaces symmetrical to each other, and
    wherein the pair of surfaces of the second rotation restricting surface forms an angle equal to the rotation angle of the crank arm therebetween.

10. The filter driving device according to claim 9, wherein, when the second rotation restricting surface contacts the first wall surface of the accommodation portion, rotation of the crank arm is restricted.

11. The filter driving device according to claim 1, further comprising:
a third stopper protruding in a second direction perpendicular to the first direction from the first wall surface of the accommodation portion and configured to at least partially surround the drive shaft, the first side of the crank arm, and the first stopper.

12. The filter driving device according to claim 11, wherein the third stopper comprises a pair of fourth rotation restricting surfaces configured to contact a straight portion of the crank arm, at least a part of the pair of fourth rotation restricting surfaces being formed in a shape of a straight line.

13. The filter driving device according to claim 12, wherein the pair of fourth rotation restricting surfaces forms an angle equal to the rotation angle of the crank arm therebetween.

14. The filter driving device according to claim 1, wherein the first stopper comprises a pair of third rotation restricting surfaces protruding in opposite directions from the first side of the crank arm to contact the first wall surface of the accommodation portion, at least a part of the pair of third rotation restricting surfaces being formed in a shape of a straight line.

15. The filter driving device according to claim 14, wherein the pair of third rotation restricting surfaces forms an angle equal to the rotation angle of the crank arm, and
wherein, when the third rotation restricting surfaces contact the first wall surface of the accommodation portion, rotation of the crank arm is restricted.

16. A camera module comprising the filter driving device according to claim 1.

17. A filter driving device, comprising:
a filter;
a coupling part coupled with the filter and including a blade protruding in a first direction from a portion of the coupling part coupled with the filter;
a crank arm having a first side directly connected to the coupling part and a second side opposite to the first side connected to a drive shaft, the crank arm reciprocatingly rotating about the drive shaft in a single plane;
a first stopper directly attached to the driveshaft and configured to restrict a rotation angle of the crank arm;
an accommodation portion configured to accommodate the filter, the coupling part, and the crank arm; and
a second stopper protruding from a first wall surface of the accommodation portion in a second direction opposite to the first direction and provided between the filter and the crank arm,
wherein the first stopper comprises a second rotation restricting surface attached to the drive shaft and fixed to the crank arm, to restrict rotation of the crank arm within the rotation angle by directly contacting the first wall surface of the accommodation portion,
wherein the first wall surface of the accommodation portion is substantially planar, and
wherein the second rotation restricting surface of the first stopper rotates together with the crank arm according to the rotation of the crank arm.

* * * * *